(12) United States Patent
Chang

(10) Patent No.: US 7,604,373 B2
(45) Date of Patent: Oct. 20, 2009

(54) HOLDING FRAME AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 25 days.

(21) Appl. No.: 11/736,592

(22) Filed: Apr. 18, 2007

(65) Prior Publication Data
US 2008/0007946 A1    Jan. 10, 2008

(30) Foreign Application Priority Data
Jul. 5, 2006    (CN) .................. 2006 1 0061510

(51) Int. Cl.
*F21S 4/00* (2006.01)
(52) U.S. Cl. .............. 362/225; 362/632; 362/633; 362/634; 362/240; 362/249.01; 349/58; 349/70
(58) Field of Classification Search ......... 362/632–634, 362/33, 97, 225, 249; 349/58, 70
See application file for complete search history.

(56) References Cited
U.S. PATENT DOCUMENTS
7,207,709 B2 *   4/2007   Chuang et al. .............. 362/633
7,220,045 B2 *   5/2007   Chang ......................... 362/633
2005/0018101 A1*   1/2005   Choi et al. .................... 349/58
2006/0038934 A1*   2/2006   Morishita et al. ............. 349/58
2007/0030663 A1*   2/2007   Ryu ............................ 362/29

FOREIGN PATENT DOCUMENTS
CN    1544981 A    11/2004
CN    1648732 A    8/2005

* cited by examiner

*Primary Examiner*—Sandra L O'Shea
*Assistant Examiner*—Evan Dzierzynski
(74) *Attorney, Agent, or Firm*—Frank R. Niranjan

(57) ABSTRACT

An exemplary holding frame (20) is for fixing lamp pairs (31) having electrode holders (311) and lamps wires (312), and includes a top surface (201), a bottom surface (202), an inner surface (203), and an outer surface (204). The top surface defines plural electrode receiving openings (2011). The bottom surface defines plural wiring openings (2021). The outer surface defines plural electrode groove pairs (2041), and each electrode groove of each of the electrode groove pairs communicates between a respective one of the wiring openings and a respective one of the electrode receiving openings. The electrode groove pairs are configured for receiving the electrode holders of the lamp pairs. The bottom surface defines plural wiring channels (2022), and each wiring channel communicates between the wiring openings at a corresponding electrode groove pair. The wiring channels configured for receiving selected portions of the lamps wires.

5 Claims, 10 Drawing Sheets

HOLDING FRAME AND BACKLIGHT MODULE USING THE SAME

BACKGROUND OF THE INVENTION

1. Field of the Invention

The present invention relates to holding frames and backlight modules using holding frames, and more particularly, to a holding frame and a backlight module for use in, for example, a liquid crystal display (LCD).

2. Discussion of the Related Art

In a liquid crystal display device, liquid crystal is a substance that does not itself emit light. Instead, the liquid crystal relies on receiving light from a light source in order to display data and images. In the case of a typical liquid crystal display device, a backlight module powered by electricity supplies the needed light.

Typically, there are two types of backlight modules: an edge lighting type, and a bottom-lighting type. The edge-lighting type of backlight module is widely used in small and medium size liquid crystal displays, because it is lightweight, thin, and consumes little energy. Large sized liquid crystal displays usually do not use an edge-lighting backlight module, because the above-described advantages are not significant. Furthermore, a large sized edge-lighting type backlight module typically does not provide a desired level of brightness and optical uniformity. Currently, the market demand for large sized liquid crystal displays is huge, and recently there has been much development of bottom-lighting type backlight modules in order to satisfy the market demand. The bottom-lighting type backlight module generally utilizes a plurality of lamps to improve brightness. However, if there are too many lamps, it can be problematic to disperse heat emitted from the lamps, and it may be inconvenient to assemble or fix the lamps in the backlight module.

Referring to FIG. 1, a typical holding frame assembly 10 used for a backlight module is shown. The holding frame assembly 10 includes two parallel lamp-holding boards 11. The lamp-holding boards 11 each define a plurality of mounting holes 111 for cooperatively fixing a plurality of lamps 12 on the holding frame assembly 10. For thermal dispersal, the lamp-holding boards 11 each define a plurality of holes 112 between various of the mounting holes 111. However, the holding frame assembly 10 does not have a mounting structure for mounting and protecting lamp wires (not shown). Thus, the lamp wires are liable to be easily damaged. In addition, because ends of the lamps 12 are tightly engaged in the mounting holes 111, heat produced by the ends of the lamps 12 is not efficiently dispersed.

What is needed, therefore, is a new holding frame and a backlight module using the holding frame which can overcome the above-mentioned disadvantages.

SUMMARY

In one embodiment, a holding frame is provided. The holding frame is for fixing a plurality of lamp pairs having electrode holders and lamps wires, and includes a top surface, a bottom surface, an inner surface, and an outer surface. The top surface defines a plurality of electrode receiving openings thereat. The bottom surface defines a plurality of wiring openings. The outer surface defines a plurality of electrode groove thereat, and each electrode groove of each of the electrode groove pairs communicates between a respective one of the wiring openings and a respective one of the electrode receiving openings. The electrode groove pairs are configured for receiving the electrode holders of the lamp pairs. The bottom surface defines a plurality of wiring channels, and each wiring channel communicates between the wiring openings at a corresponding electrode groove pair. The wiring channels configured for receiving selected portions of the lamps wires.

In another embodiment, a backlight module includes a reflecting plate, a plurality of lamp pairs, and a pair of holding frames. The lamps are disposed above the reflecting plate, each of the lamps includes two electrode holders at two opposite ends thereof respectively and a plurality of lamps wires for interconnecting the electrode holders. The holding frames are disposed at two opposite sides of the reflecting plate. Each of the holding frames includes a top surface, a bottom surface, an inner surface, and an outer surface. The top surface defines a plurality of electrode receiving openings thereat. The bottom surface defines a plurality of wiring openings. The outer surface defines a plurality of electrode groove thereat, and each electrode groove of each of the electrode groove pairs communicates between a respective one of the wiring openings and a respective one of the electrode receiving openings. The electrode groove pairs are configured for receiving the electrode holders of the lamp pairs. The bottom surface defines a plurality of wiring channels, and each wiring channel communicates between the wiring openings at a corresponding electrode groove pair. The wiring channels configured for receiving selected portions of the lamps wires.

Other novel features and advantages will become more apparent from the following detailed description of preferred and exemplary embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present holding frame and backlight module using the holding frame. Moreover, in the drawings, like reference numerals designate corresponding parts throughout the several views.

DETAILED DESCRIPTION OF THE EMBODIMENTS

Reference will now be made to the drawings to describe preferred embodiments of the present holding frame and backlight module using the holding frame in detail.

Figure 1:
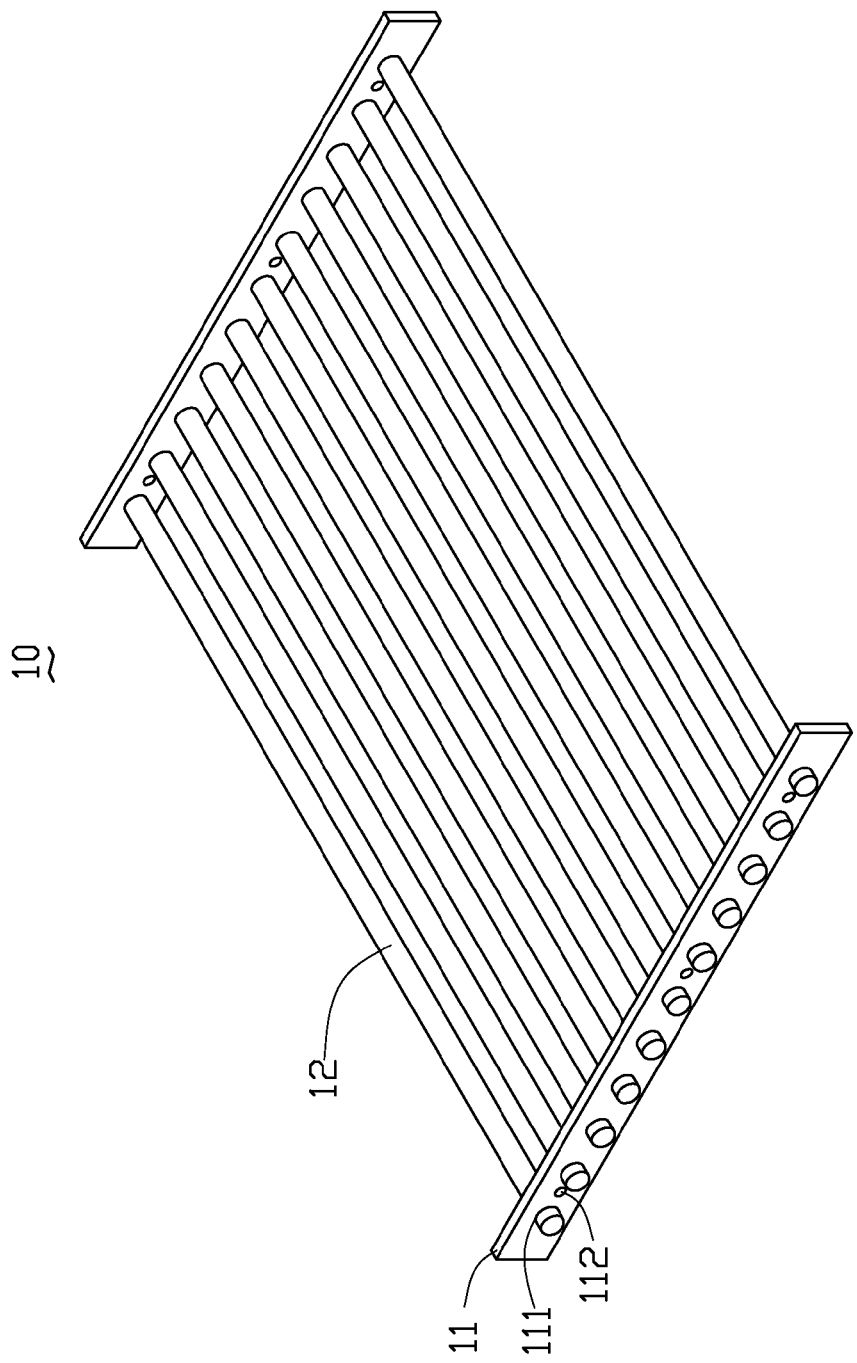
FIG. 1 is an isometric view of a conventional holding frame assembly.
Figure 2:
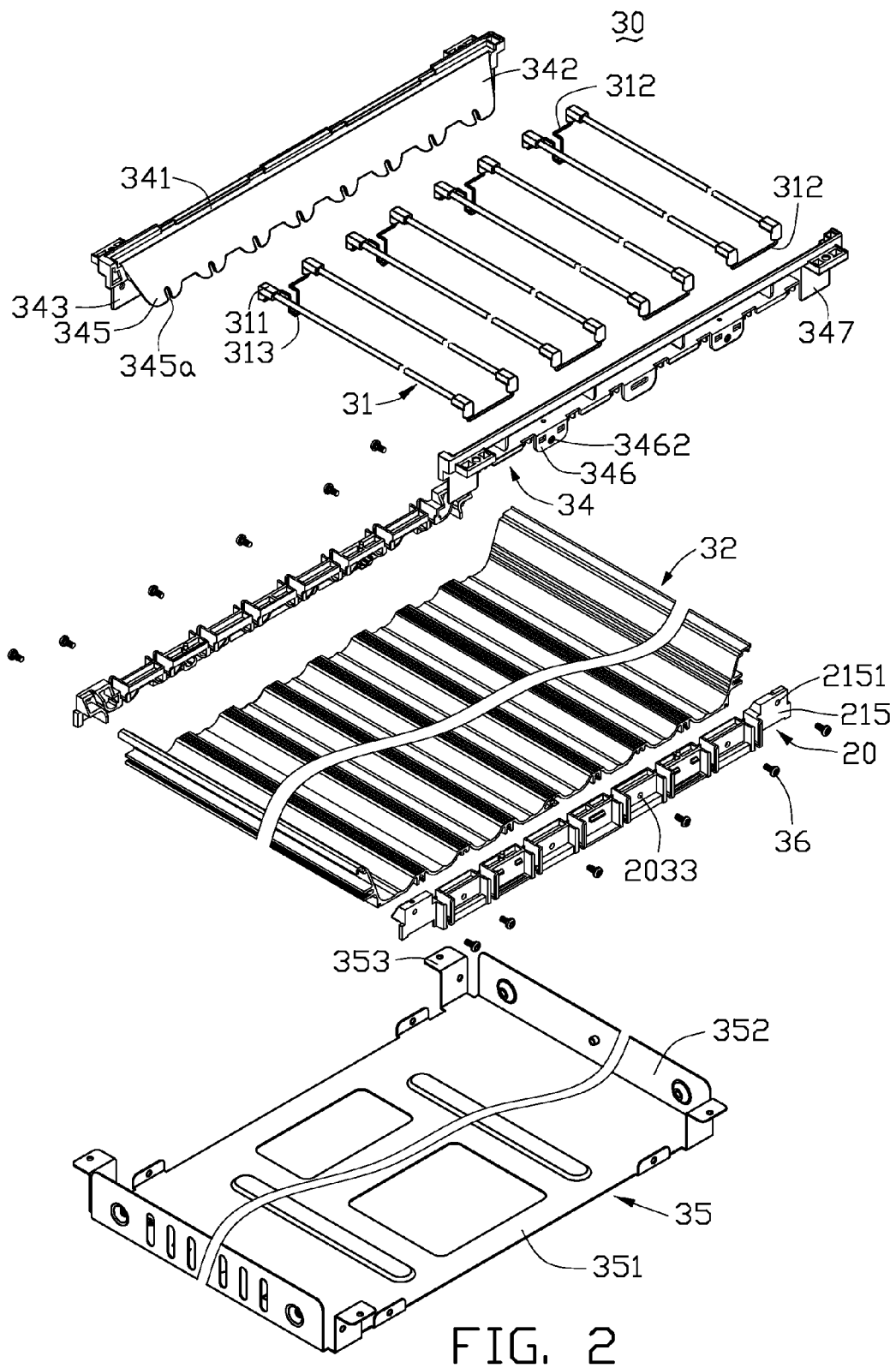
FIG. 2 is an exploded, abbreviated, isometric view of a backlight module according to a preferred embodiment of the present invention.

Referring to FIG. 2, a backlight module 30 using a pair of holding frames 20 in accordance with a preferred embodiment is shown. The backlight module 30 includes a plurality of lamp pairs 31, a reflecting plate 32, the holding frames 20, two lamp stabilizers 34, a base plate 35, and a plurality of screws 36.

Each of the lamp pairs 31 includes two lamps. Each of opposite ends of each lamp includes a lamp fixing end (not labeled). Each of the lamp fixing ends includes an electrode (not visible) that is covered by an electrode holder 311. The electrode holder 311 is generally L-shaped. A first lamp wire 312 interconnects the two electrode holders 311 at a same first end of the lamps in each of the lamp pairs 31. A pair of second lamp wires 312 connects the two electrode holders 311 at a same second end of the lamps in each of the lamp pairs 31 with a respective connector 313.

Figure 3:
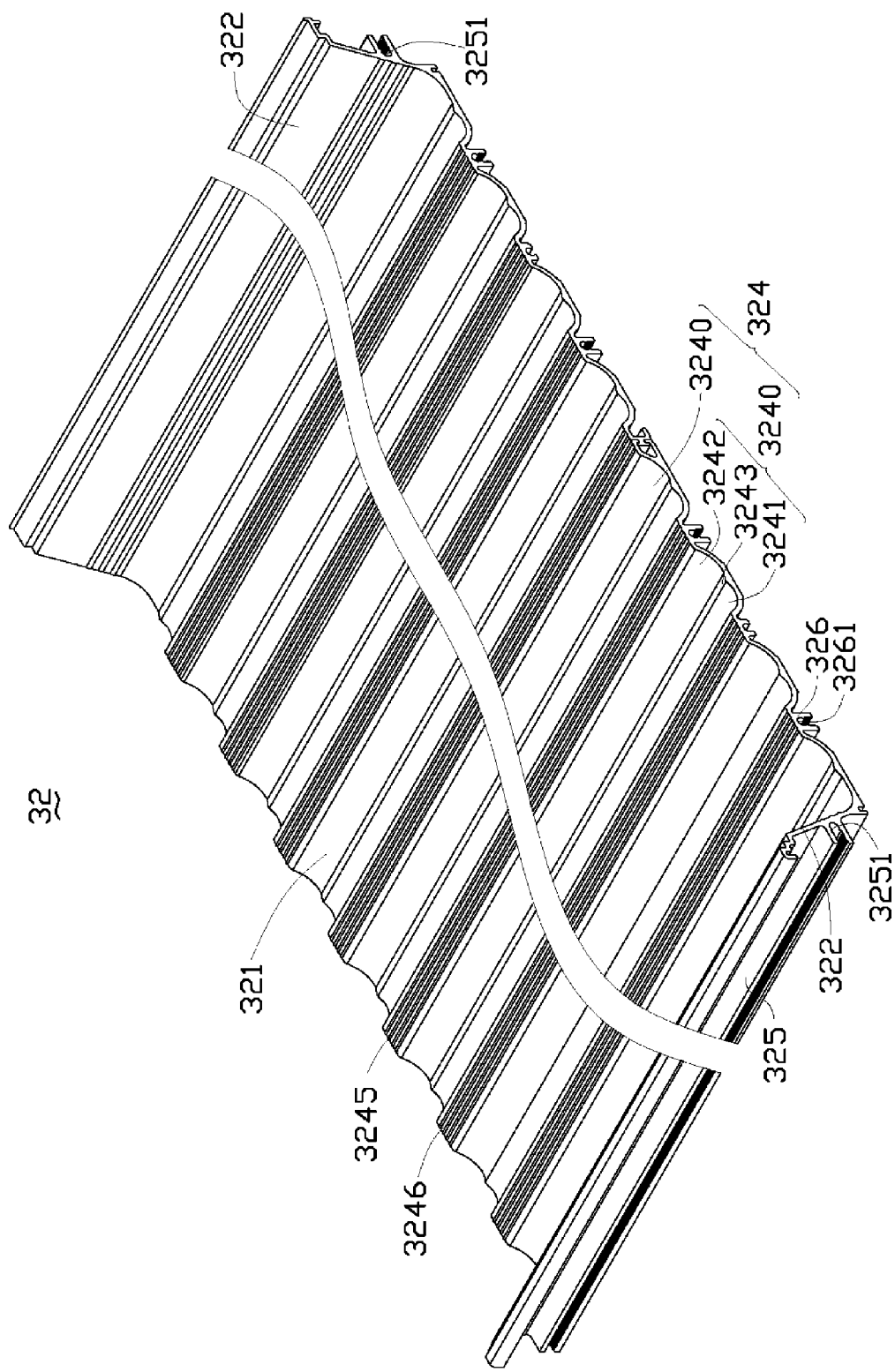
FIG. 3 is an enlarged view of a reflecting plate of the backlight module of FIG. 2.

Referring also to FIG. 3, the reflecting plate 32 includes a bottom portion 321 and two side portions 322. The bottom portion 321 of the reflecting plate 32 defines a plurality of adjacent reflecting surface pairs 324, each reflecting surface pair 324 corresponding to a respective lamp pair 31. Each reflecting surface pair 324 includes two reflecting surfaces 3240 parallel to each other. Each reflecting surface 3240 includes a first concave surface 3241, a second concave surface 3242, and an inclined flat surface 3243 interconnecting the first concave surface 3241 and the second concave surface 3242. The reflecting surfaces 3240 in each reflecting surface pair 324 are interconnected by a respective first connecting portion 3245. Further, a reflecting surface 3240 of one reflecting surface pair 324 and a nearest reflecting surface 3240 of an adjacent reflecting surface pair 324 are interconnected by a respective second connecting portion 3246. In the preferred embodiment, the first and second connecting portions 3245, 3246 are substantially the same, and are oriented parallel to each other. Each of the first connecting portions 3245 includes two opposite ends 326. Each end 326 is substantially bifurcated, and defines a threaded hole 3261 at the bifurcation thereof. The threaded hole 3261 is configured for threadingly receiving a respective one of the screws 36. In the illustrated embodiment, there are four threaded holes 3261 at each of two lateral sides of the reflecting plate 32. Each of the side portions 322 includes a protruding beam 325 extending from an exterior side surface thereof. The protruding beam 325 defines two threaded holes 3251 in two opposite ends thereof. The threaded holes 3261, 3251 are configured for engaging with the screws 36.

Figure 4:
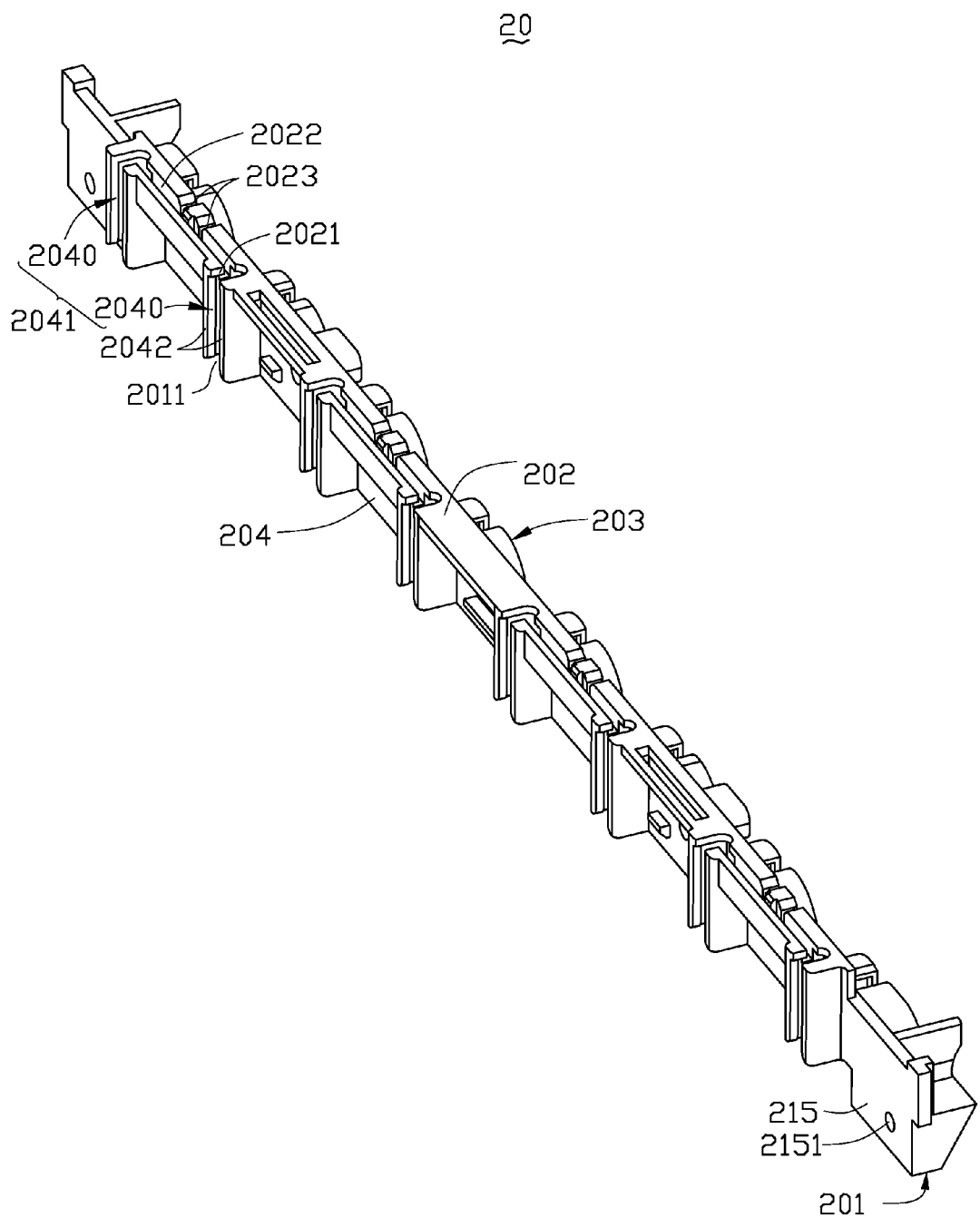
FIG. 4 is an enlarged, isometric view of one of holding frames of the backlight module of FIG. 2, but showing the holding frame inverted.

Referring also to FIG. 4, each holding frame 20 includes a top surface 201, a bottom surface 202, an inner surface 203, and an outer surface 204. The outer surface 204 of the holding frame 20 defines a plurality of electrode groove pairs 2041 thereat. Each electrode groove 2040 of the electrode groove pair 2041 perpendicularly extends from a respective wiring opening 2021 defined at the bottom surface 202 to a respective electrode receiving opening 2011 defined at the top surface 201 of the holding frame 20. Each of the electrode grooves 2040 is partly bounded by a pair of railings 2042 formed at the outer surface 204 in a way such that a width between the railings is less than a corresponding width of the electrode receiving opening 2011. A plurality of wiring channels 2022 is defined at the bottom surface 202 of the holding frame 20. Each wiring channel 2022 communicates between the wiring openings 2021 at a corresponding electrode groove pair 2041. The bottom surface 202 further defines a plurality of wiring outlet pairs 2023 thereat. Each wiring outlet pair 2023 communicates between a respective wiring channel 2022 and the inner surface 203.

Figure 5:
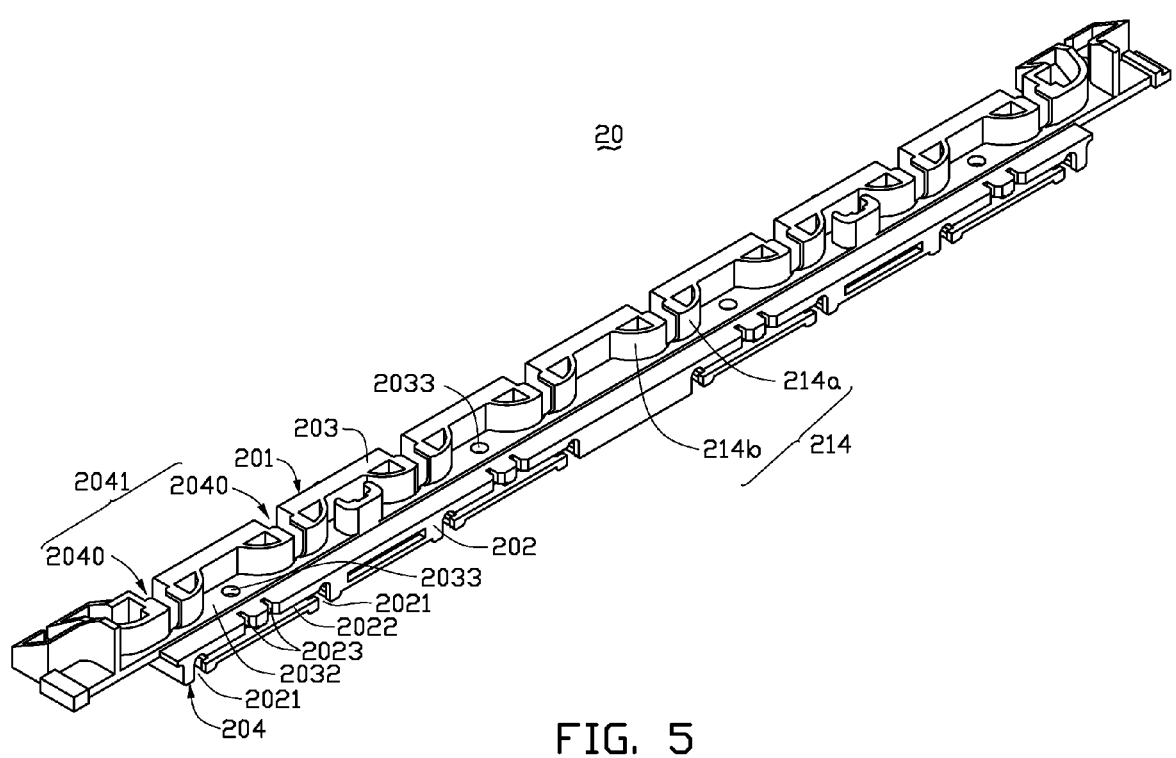
FIG. 5 is an isometric view of the holding frame of FIG. 4, but viewed from another aspect.
Figure 6:
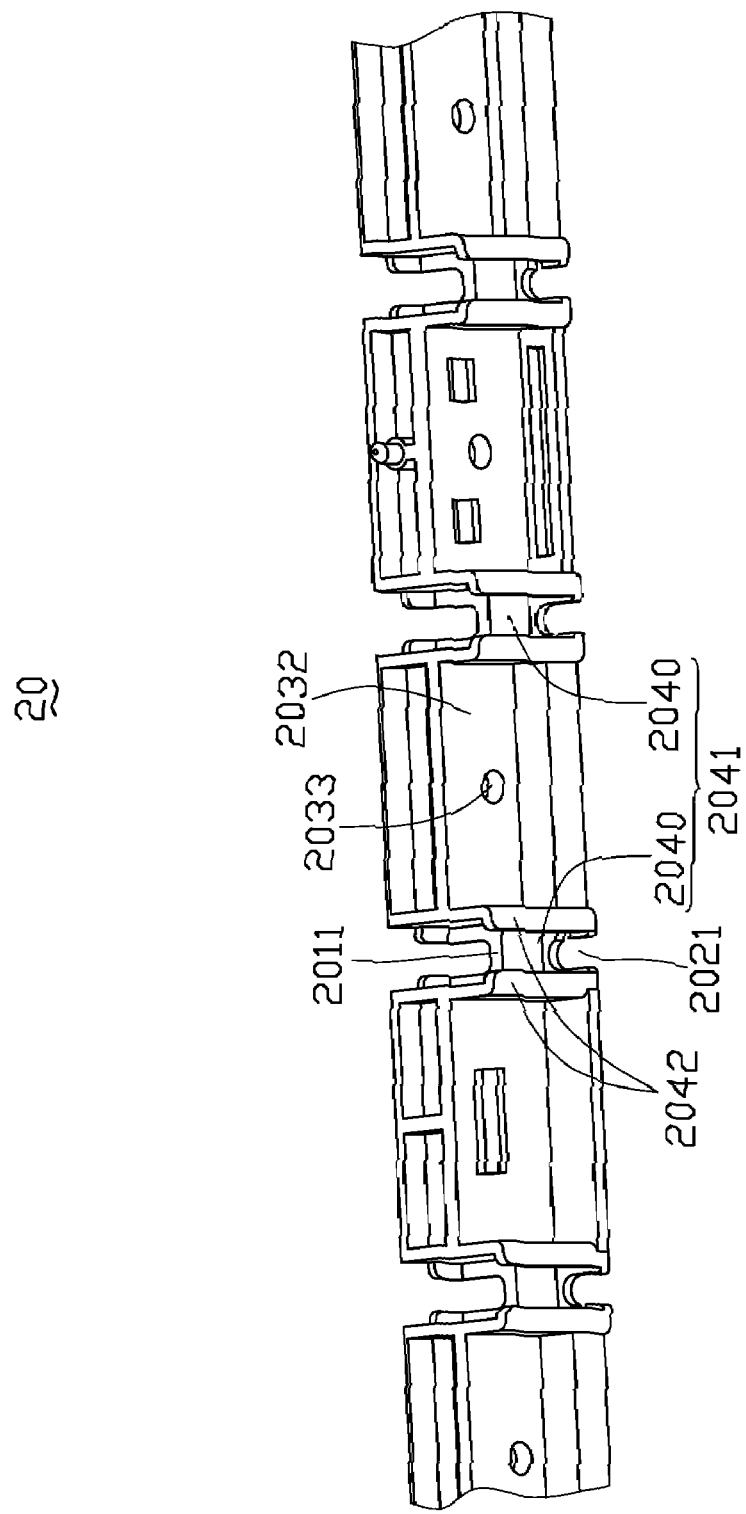
FIG. 6 is an enlarged, isometric view of part of the holding frame of FIG. 4, but viewed from another aspect.
Figure 7:
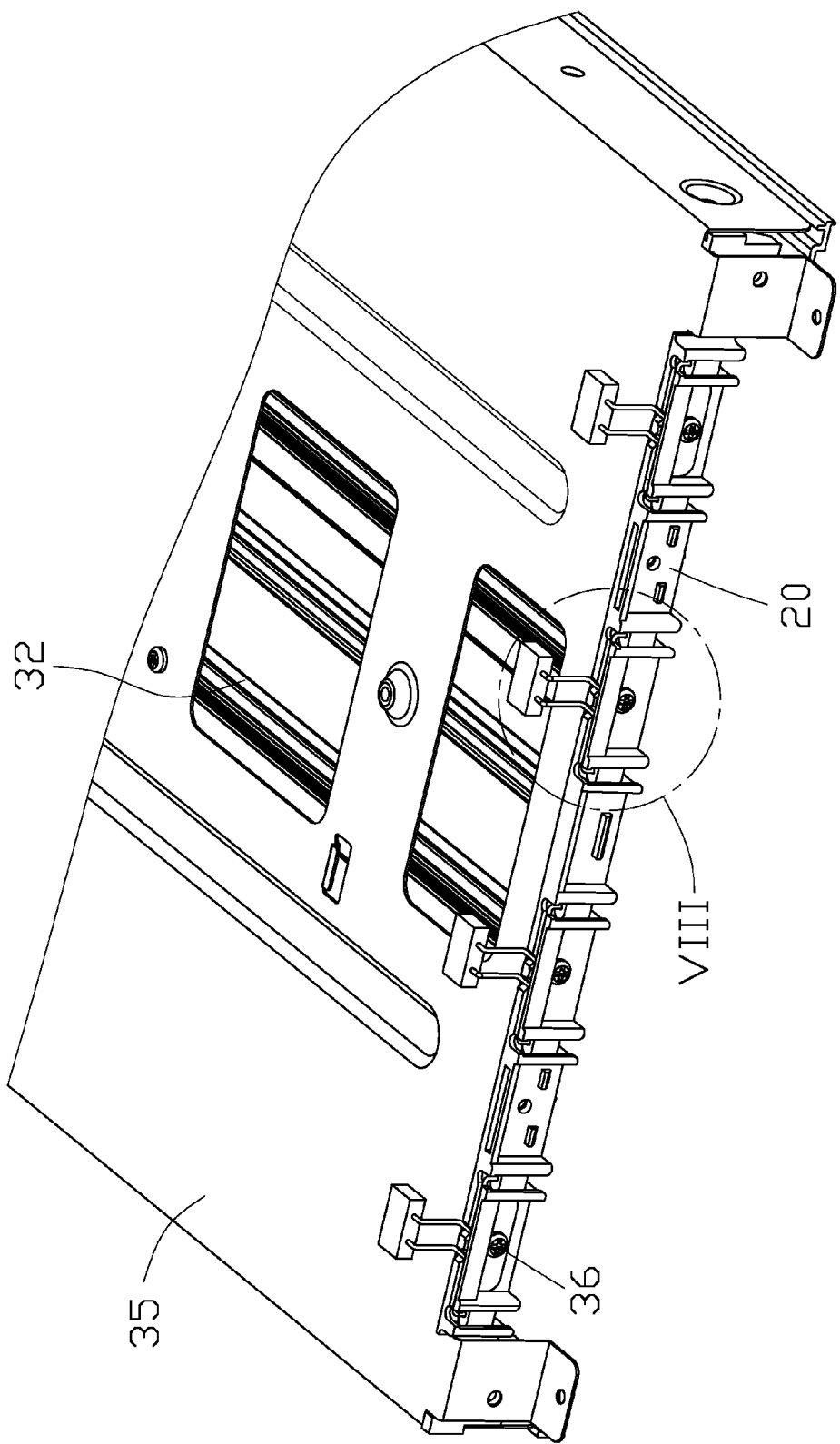
FIG. 7 is an assembled view of the backlight module of FIG. 2 viewed from one side thereof, but with the backlight module inverted, and showing only part of the backlight module.
Figure 8:
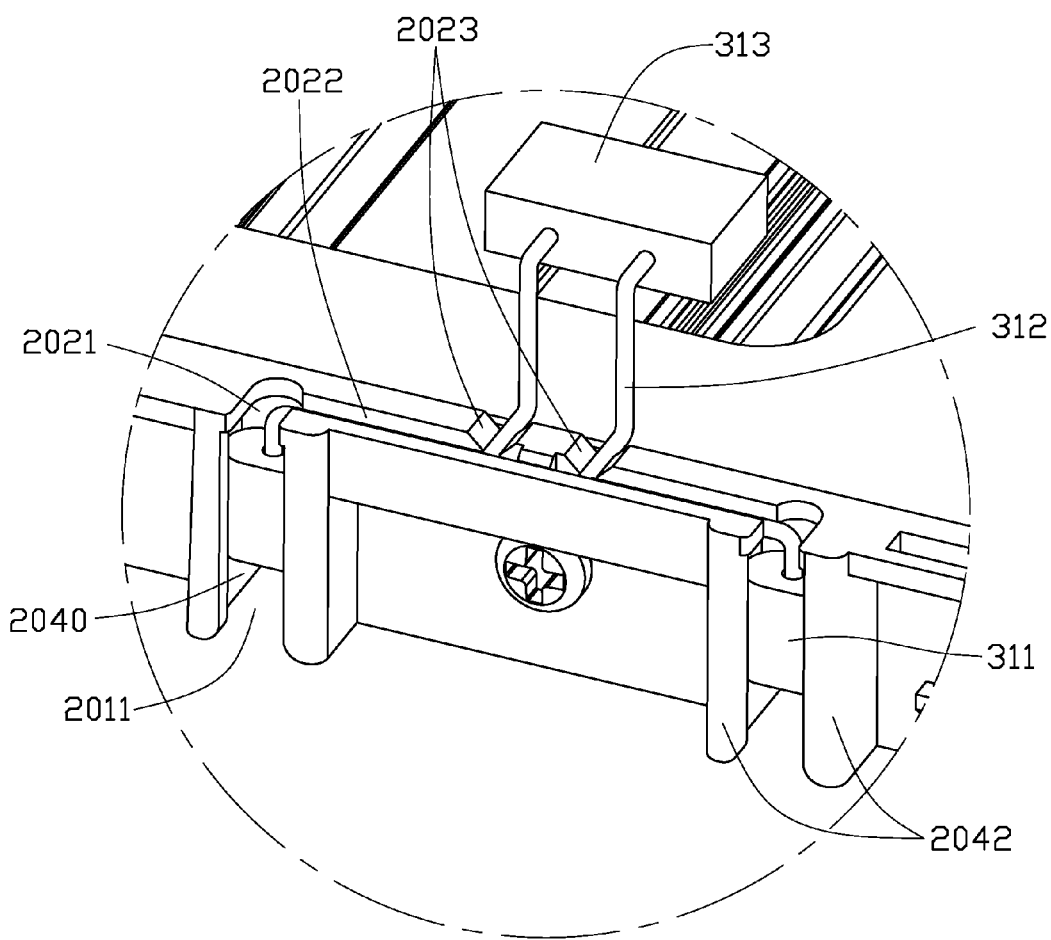
FIG. 8 is an enlarged view of a circled portion VII of FIG. 7.
Figure 9:
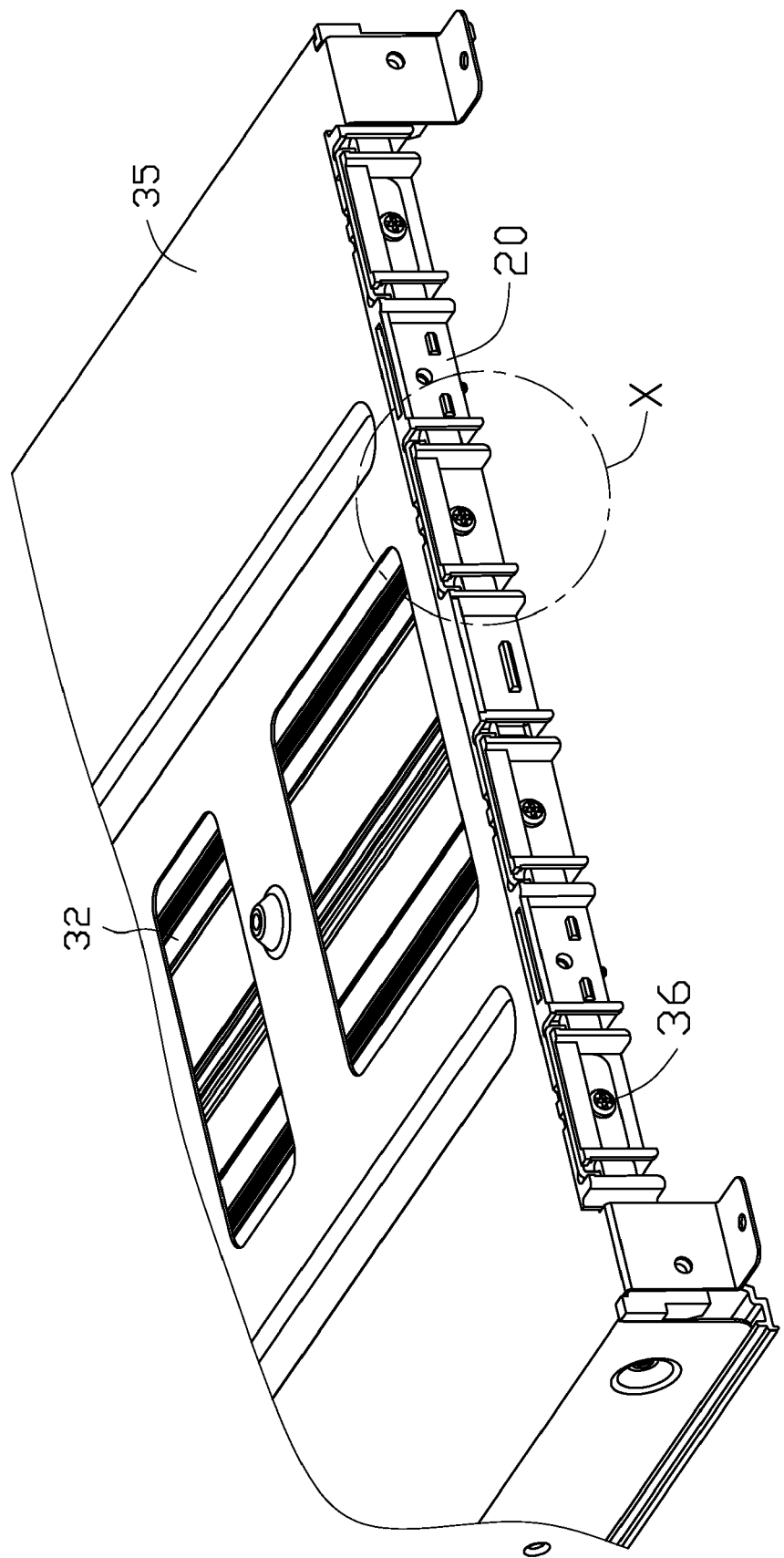
FIG. 9 is similar to FIG. 7, but showing the backlight module viewed from an opposite side thereof.
Figure 10:
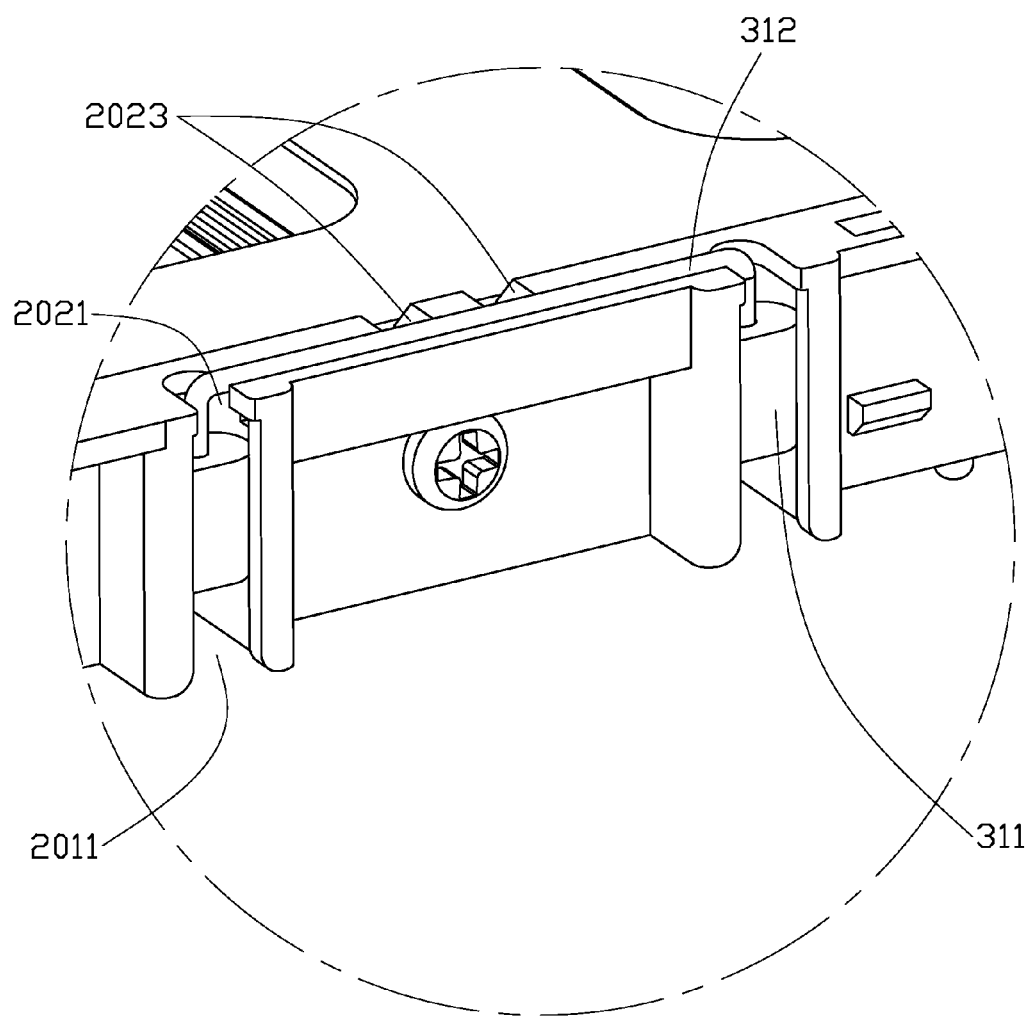
FIG. 10 is an enlarged view of a circled portion X of FIG. 9.

Referring also to FIGS. 5-6, the holding frame 20 also includes a plate mounting surface 2032. The plate mounting surface 2032 is located at a depressed area of the holding frame 20, and is parallel to the inner surface 203. In another aspect, the plate mounting surface 2032 is located parallel to the outer surface 203, but at a side of the holding frame 20 opposite to the side where the outer surface 203 is. A plurality of through holes 2033 is defined in the depressed area of the holding frame 20, each through hole 2033 spanning between the plate mounting surface 2032 and the outer surface 204. The through holes 2033 are located at certain selected of the electrode groove pairs 2041. The through holes 2033 of the holding frame 20 correspond to the threaded holes 3261 of the reflecting plate 32. In the illustrated embodiment, there are four through holes 2033 in the holding frame 20. The inner surface 203 of the holding frame 20 has a plurality of mounting structures 214 provided thereat. The mounting structures 214 generally extend between the plate mounting surface 2032 and the inner surface 203. Each mounting structure 214 is substantially bifurcated, and includes a first protrusion 214a and a second protrusion 214b. The first and second protrusions 214a, 214b are located generally at respective opposite sides of a corresponding electrode groove 2040, and are oriented symmetrically opposite each other. Bottom surfaces of the protrusions 214a, 214b are convex, and are shaped to match the curvatures of the corresponding first and second concave surfaces 3241, 3242 of the reflecting plate 32. Two extending blocks 215 extend from two opposite ends of the holding frame 20 respectively. Each of the extending blocks 215 defines a through hole 2151 therein. The through holes 2151 of the extending blocks 215 correspond to the respective threaded holes 3251 of the side portions 32 the reflecting plate 32.

Referring to FIG. 2, the lamp stabilizers 34 are configured for fitting onto the two holding frames 20 respectively. Each of the lamp stabilizers 34 includes a top beam portion 341, a lamp-holding plate 342, and a supporting wall 343. Each of the lamp-holding plate 342 and the supporting wall 343 is adjacent to the top beam portion 341, and extends therefrom. The lamp-holding plate 342 is connected to the top beam portion 341, and an angle defined between the lamp-holding plate 342 and the top beam portion 341 is an acute angle. A bottom of the lamp-holding plate 342 defines a wavy end 345. The wavy end 345 includes a plurality of recesses, which correspond to the first and second connecting portions 3245, 3246 of the reflecting plate 32. The wavy end 345 also includes a plurality of protrusions between the recesses respectively. Each protrusion defines a groove 345a corresponding to a respective lamp among the lamp pairs 31. The supporting wall 343 includes three clipping plates 346 extending down from a main middle portion thereof, and two blocking plates 347 extending down from two end portions thereof respectively. Two of the clipping plates 346 that are nearest the blocking plates 347 each define a round hole 3462. The round holes 3462 of these clipping plates 346 correspond to two of the through holes 2033 of the respective holding frame 20.

The base plate 35 is configured for receiving the reflecting plate 32. The base plate 35 includes a bottom plate 351, and two side protecting plates 352 perpendicularly extending up from opposite ends of the bottom plate 351 respectively. The two side protecting plates 352 correspond to the two side portions 322 of the reflecting plate 32. Two L-shaped fixing arms 353 extend from each of two opposite long sides of the bottom plate 351. Two of the fixing arms 353 are adjacent to one of the side protecting plates 352, and the other two fixing arms 353 are adjacent to the other protecting plate 352.

To assemble the backlight module 30, each holding frame 20 is aligned with a corresponding one of opposite sides of the reflecting plate 32. For each holding frame 20, two of the screws 36 are extended through the through holes 2151 of the holding frame 20 and engaged in the corresponding threaded holes 3251 of the reflecting plate 32. Another two of the screws 36 are extended through two centermost of the through holes 2033 of the holding frame 20 and engaged in the corresponding threaded holes 3261 of the reflecting plate 32. Thereby, the holding frames 20 are fixed to the two sides of the reflecting plate 32. In this position, the mounting structures 214 of the holding frames 20 are fittingly engaged in the corresponding reflecting surface pairs 324 of the reflecting plate 32. Then the lamp pairs 31 are received above the corresponding reflecting surface pairs 324 of the reflecting plate 32. The electrode holders 311 of the lamp pairs 31 are slidingly received in the electrode grooves 2040 of the corresponding electrode groove pairs 2041 via the corresponding electrode receiving openings 2011 of the holding frames 20.

Referring also to FIGS. 7-10, for each lamp pair 31, parts of the two lamp wires 312 connecting the electrode holders 311 to the connector 313 are received in the corresponding wiring channel 2022 of one of the holding frames 20. These two lamp wires 312 run through the corresponding wiring outlet pairs 2023 respectively, to help ensure that the connector 313 is not easily damaged. For each lamp pair 31, the lamp wire 312 interconnecting the first ends of the lamps are received in the corresponding wiring channel 2022 of the other holding frame 20. Then the lamp stabilizers 34 are positioned on the holding frames 20. The wavy end 345 of the lamp-holding plate 342 of each lamp stabilizer 34 clamps the corresponding first and second connecting portions 3245, 3246 of the reflecting plate 32, and the grooves 345a of the lamp-holding plate 342 slidingly receive the lamps. The blocking plates 347 of the lamp stabilizers 34 abut the corresponding extending blocks 215 of the holding frame 20. At each of two opposite sides of the subassembly, another two of the screws 36 are extended through the round holes 3462 of the corresponding lamp stabilizer 34 and through the two endmost of the through holes 2033 of the corresponding holding frame 20 and engaged in the corresponding threaded holes 3261 of the reflecting plate 32. Thereby, the lamp stabilizers 34 are fixed to the two sides of the subassembly. The reflecting plate 32 of the subassembly is placed in the base plate 35, with the side protecting plates 352 of the base plate 35 abutting the side portions 322 of the reflecting plate 32, and the L-shaped fixing arms 353 of the base plate 35 abutting the blocking plates 347 of the lamp stabilizers 34.

The backlight module 30 has at least the following advantages. For each lamp pair 31, parts of the two lamp wires 312 connecting the electrode holders 311 to the connector 313 are received in the corresponding wiring channel 2022 of one of the holding frames 20 and run through the corresponding wiring outlet pairs 2023 respectively. Thus the connector 313 is not easily damaged. In addition, each of the electrode grooves 2040 of the electrode groove pairs 2041 is partly bounded by a pair of railings 2042 formed at the outer surface 204 in a way such that a width between the railings is less than a corresponding width of the electrode receiving opening 2011. Thus the electrode holders 311 of the lamp pairs 31 can be firmly fixed in the electrode grooves 2040 of the electrode groove pairs 2041. Furthermore, the electrode grooves 2040 of the electrode groove pairs 2041 are partially open to an exterior of the backlight module 30. This facilitates dissipation of heat emitted from the electrode holders 311 of the lamp pairs 31.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A holding frame for fixing a plurality of lamp pairs having electrode holders and lamps wires, the holding frame comprising:
    a top surface, a bottom surface, an outer surface, and an inner surface;
    a plurality of electrode receiving openings defined at the top surface;
    a plurality of wiring openings defined at the bottom surface;
    a plurality of electrode groove pairs defined at the outer surface, each electrode groove of each of the electrode groove pairs communicating between a respective one of the wiring openings and a respective one of the electrode receiving openings, the electrode groove pairs configured for receiving the electrode holders of the lamp pairs, wherein each of the electrode grooves is partly bounded by a pair of railings formed at the outer surface, and a width between the railings is less than a corresponding width of the electrode receiving opening at the electrode groove;
    a plurality of wiring channels defined at the bottom surface, each wiring channel communicating between the wiring openings at a corresponding electrode groove pair, the wiring channels configured for receiving selected portions of the lamp wires;
    a plurality of wiring outlet pairs defined at the bottom surface, and each wiring outlet of each of the wiring outlet pairs communicating between a respective wiring channel and the inner surface;
    a depressed area parallel to the inner surface, and a plate mounting surface located at the depressed area, wherein the plate mounting surface is parallel to the inner surface, and parallel to the outer surface but at a side of the holding frame opposite to the side where the outer surface is; and
    a plurality of mounting structures extending generally between the plate mounting surface and the inner surface, wherein each of the mounting structures comprises a first protrusion and a second protrusion, the first and second protrusions are located generally at respective opposite sides of a corresponding one of the electrode grooves, and are oriented symmetrically opposite each other, and bottom surfaces of the first and second protrusions are convex.

2. A backlight module comprising:
    a reflecting plate;
    a plurality of lamp pairs disposed above the reflecting plate, each lamp of the lamp pairs having two electrode holders at two opposite ends thereof respectively and a plurality of lamps wires for interconnecting the electrode holders; and a pair of holding frames disposed at two opposite sides of the reflecting plate, each of the holding frames comprising:

a top surface, a bottom surface, an outer surface, and an inner surface;

a plurality of electrode receiving openings defined at the top surface;

a plurality of wiring openings defined at the bottom surface;

a plurality of electrode groove pairs defined at the outer surface, each electrode groove of each of the electrode groove pairs communicating between a respective one of the wiring openings and a respective one of the electrode receiving openings, the electrode groove pairs configured for receiving the electrode holders of the lamp pairs, wherein in each of the holding frames, each of the electrode grooves is partly bounded by a pair of railings formed at the outer surface, and a width between the railings is less than a corresponding width of the electrode receiving opening at the electrode groove; and a plurality of wiring channels defined at the bottom surface, each wiring channel communicating between the wiring openings at a corresponding electrode groove pair, the wiring channels configured for receiving selected portions of the lamp wires;

a plurality of wiring outlet pairs defined at the bottom surface, and each wiring outlet of each of the wiring outlet pairs communicating between a respective wiring channel and the inner surface; and a depressed area parallel to the inner surface, and a plate mounting surface located at the depressed area, wherein the plate mounting surface is parallel to the inner surface, and parallel to the outer surface but at a side of the holding frame opposite to the side where the outer surface is;

wherein the reflecting plate comprises a bottom portion, the bottom portion defines a plurality of reflecting surface pairs, and the reflecting surface pairs correspond to the lamp pairs and are generally adjacent each other: and each reflecting surface pair comprises two reflecting surfaces parallel to each other, each reflecting surface comprises a first concave surface, a second concave surface, and an inclined flat surface interconnecting the first concave surface and the second concave surface, and in each of the holding frames, each of the mounting structures comprises a first protrusion and a second protrusion, the first and second protrusions are located generally at respective opposite sides of a corresponding one of the electrode grooves and are oriented symmetrically opposite each other, and bottom surfaces of the first and second protrusions are convex and shaped to match the curvatures of the first and second concave surfaces of a corresponding one of the reflective surfaces of the reflecting plate.

3. The backlight module according to claim 2, wherein the reflecting surfaces in each reflecting surface pair are interconnected by a respective first connecting portion, a reflecting surface of each reflecting surface pair and a nearest reflecting surface of an adjacent reflecting surface pair are interconnected by a respective second connecting portion, and the first and second connecting portions are oriented parallel to each other.

4. The backlight module according to claim 3, further comprising two lamp stabilizers fitted onto the two holding frames respectively, wherein each of the lamp stabilizers includes a top beam portion, a lamp-holding plate connecting to the top beam portion, and a supporting wall, a bottom of the lamp-holding plate defines a wavy end, the wavy end includes a plurality of recesses corresponding to the first and second connecting portions of the reflecting plate and a plurality of protrusions between the recesses respectively, and each of the protrusions defines a groove corresponding to a respective one of the lamps among the lamp pairs.

5. The backlight module according to claim 3, further comprising a plurality of screws, wherein each of the first connecting portions of the reflecting plate includes two opposite ends, each of the ends is substantially bifurcated and defines a threaded hole at the bifurcation thereof, each of the holding frames defines a plurality of through holes at certain selected of the electrode groove pairs, each through hole spans between the plate mounting surface and the outer surface, and the screws are extended through the through holes of the holding frames and engaged in the corresponding threaded holes of the reflecting plate.

* * * * *